United States Patent
Zhang et al.

(10) Patent No.: US 12,174,419 B2
(45) Date of Patent: Dec. 24, 2024

(54) THIN FILM LITHIUM NIOBATE HYBRID PHOTONICS PACKAGING

(71) Applicant: HyperLight Corporation, Cambridge, MA (US)

(72) Inventors: Mian Zhang, Cambridge, MA (US);
Roy Meade, Bastrop, TX (US);
Christian Reimer, Wellesley, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/208,828

(22) Filed: Jun. 12, 2023

(65) Prior Publication Data

US 2023/0400631 A1    Dec. 14, 2023

Related U.S. Application Data

(60) Provisional application No. 63/351,730, filed on Jun. 13, 2022.

(51) Int. Cl.
*G02B 6/12* (2006.01)
*G02B 6/122* (2006.01)

(52) U.S. Cl.
CPC ...... *G02B 6/122* (2013.01); *G02B 2006/1204* (2013.01); *G02B 2006/12061* (2013.01); *G02B 2006/12097* (2013.01); *G02B 2006/12121* (2013.01)

(58) Field of Classification Search
CPC .. G02B 6/12002; G02B 6/12004; G02B 6/13; G02B 2006/1204; G02B 2006/12061; G02F 1/035; G02F 1/0356

USPC .................................................. 385/1–3, 14
See application file for complete search history.

(56) References Cited

U.S. PATENT DOCUMENTS

| | | | | |
|---|---|---|---|---|
| 5,159,700 | A | * | 10/1992 | Reid .......................... G02B 6/43 257/E31.095 |
| 5,379,359 | A | * | 1/1995 | Gupta ...................... H01S 5/026 438/31 |
| 11,675,126 | B1 | * | 6/2023 | Kodigala ................ H01S 5/209 385/14 |

(Continued)

FOREIGN PATENT DOCUMENTS

JP    7-245450    * 9/1995 ............... H01S 3/18

OTHER PUBLICATIONS

"Integrated lithium niobate photonics and Applications", a PHD thesis by Shams-Ansari, May 2022.*

(Continued)

*Primary Examiner* — Robert Tavlykaev
(74) *Attorney, Agent, or Firm* — Van Pelt, Yi & James LLP

(57) ABSTRACT

A hybrid photonics device package is described. The hybrid photonics device package includes an electro-optic integrated circuit and a photonics integrated circuit. The electro-optic integrated circuit includes an optical structure and an electrode on a first substrate. The optical structure has a thin film electro-optic layer including lithium. The photonics integrated circuit includes a second substrate and a photonics component on the second substrate. The photonics component and the optical structure are optically coupled. One of the electro-optic integrated circuit and the photonics integrated circuit is mounted on an other of the electro-optic integrated circuit and the photonics integrated circuit.

10 Claims, 6 Drawing Sheets

(56) References Cited

U.S. PATENT DOCUMENTS

| | | | |
|---|---|---|---|
| 11,789,202 B2* | 10/2023 | Ji | G02B 6/4245 |
| | | | 385/14 |
| 2011/0266469 A1* | 11/2011 | Goulakov | G11B 5/3173 |
| | | | 29/428 |
| 2020/0064706 A1* | 2/2020 | Villa | G02F 1/2255 |
| 2022/0163827 A1* | 5/2022 | Sugiyama | G02F 1/212 |
| 2023/0130139 A1* | 4/2023 | Shrestha | G02B 6/12004 |
| | | | 385/14 |

OTHER PUBLICATIONS

"Electrically pumped laser transmitter integrated on thin-film lithium niobate" by Shams-Ansari et al, Optica, vol. 9, No. 4, pp. 408-411, Apr. 2022.*

"High-Power Photodiodes With 65 GHz Bandwidth Heterogeneously Integrated Onto Silicon-on-Insulator Nano-Waveguides" by Wang et al, IEEE Journal of Selected Topics in Quantum Electronics, vol. 24, No. 2, paper 6000206 (Year: 2018).*

* cited by examiner

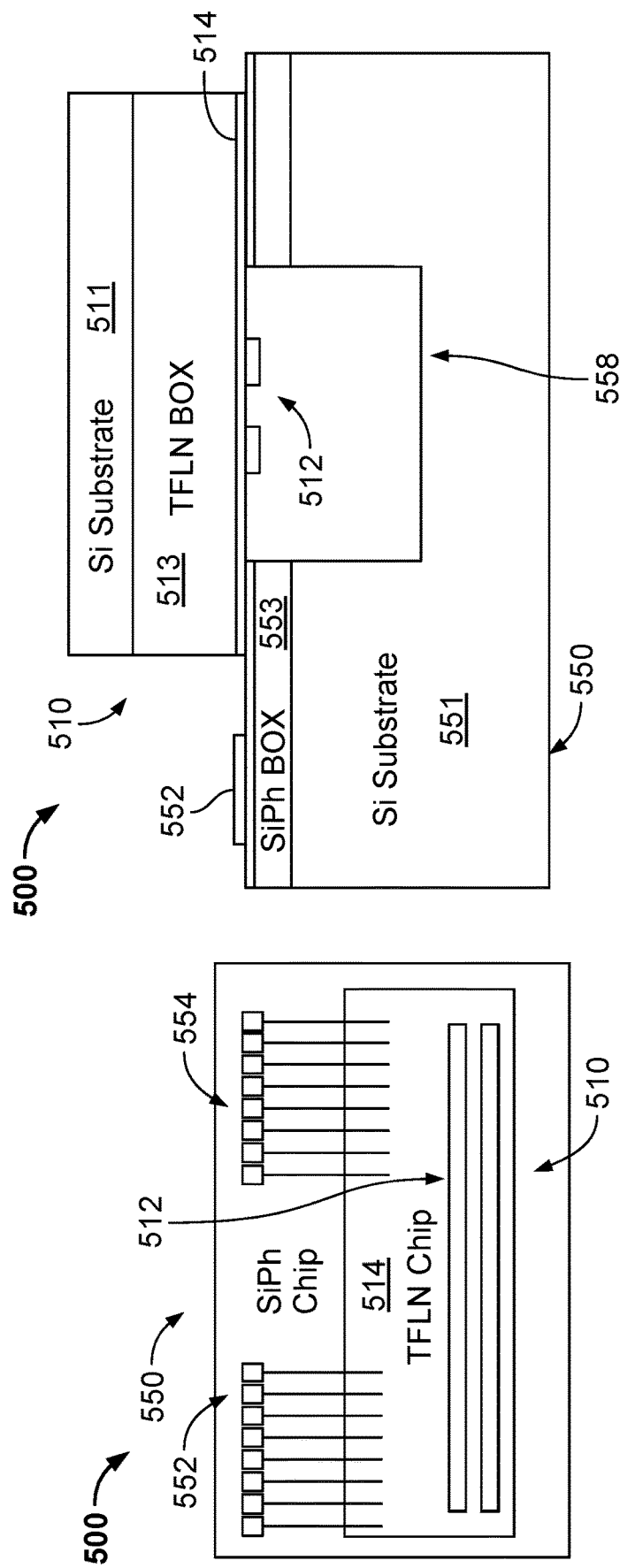

THIN FILM LITHIUM NIOBATE HYBRID PHOTONICS PACKAGING

CROSS REFERENCE TO OTHER APPLICATIONS

This application claims priority to U.S. Provisional Patent Application No. 63/351,730 entitled THIN FILM LITHIUM NIOBATE HYBRID PHOTONICS PACKAGING filed Jun. 13, 2022 which is incorporated herein by reference for all purposes.

BACKGROUND OF THE INVENTION

Lithium-containing thin film electro-optic (TFEO) materials include thin film lithium niobate (TFLN) and thin film lithium tantalate (TFLT). TFEO materials that contain lithium may have a large modulation in the index of refraction for a given applied electric field, which is desirable. Further, lithium-containing TFEO materials are desired to be integrated with photonics devices based on other materials, forming a heterogeneous device. Integrated heterogeneous devices may have improved performance and/or additional functionality. For example, silicon photonics (SiPh) devices have been integrated with III-V devices, such as InP lasers.

Although integration of lithium-containing TFEO devices with SiPh and/or III-V devices is possible, sacrifices in the desired performance are made to achieve integration. For example, an insulator (e.g. a buried oxide (BOX) layer) may have different desired thicknesses for SiPh devices than for TFLN devices. Use of a BOX layer that has an intermediate thickness may result in a heterogeneous device having poorer performance than desired. Different materials also have different properties. For example, the coefficients of thermal expansion for material(s) for other photonics devices may be different than those of material(s) used in a lithium-containing TFEO device. This may result in alignment issues, performance issues and/or reliability issues. Other techniques for integrating devices may have issues with packaging complexity, alignment, or performance. Consequently, improved techniques for integrating lithium-containing TFEO devices with other photonics devices are desired.

BRIEF DESCRIPTION OF THE DRAWINGS

Various embodiments of the invention are disclosed in the following detailed description and the accompanying drawings.

FIGS. 5A and 5B depict top and cross-sectional views of an embodiment of a hybrid photonics device package.

DETAILED DESCRIPTION

Figure 1A:
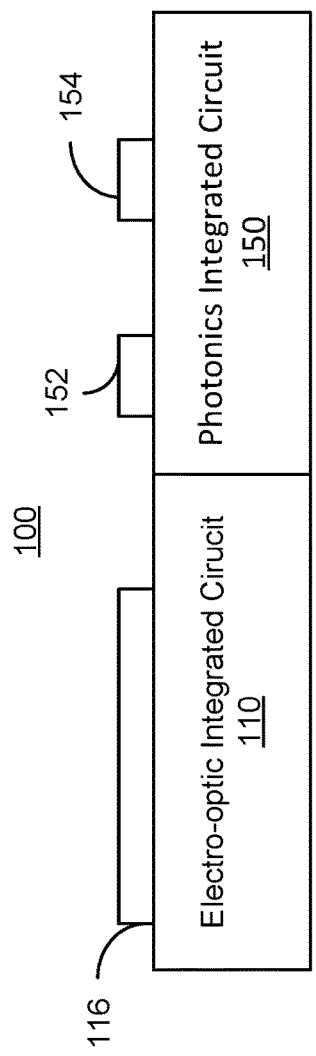
FIGS. 1A-1B depict an embodiment of a hybrid photonics device package including lith.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to improve device performance, photonics devices based on various materials are desired to be integrated. For example, silicon photonics (SiPh) devices have been integrated with III-V devices, such as InP lasers. Other thin film electro-optic (TFEO) materials that are desired to be integrated with other photonics devices include lithium-containing TFEO materials such as thin film lithium niobate (TFLN) and thin film lithium tantalate (TFLT). A lithium-containing TFEO layer (e.g. TFLN and/or TFLT layer(s)) may have a thickness not exceeding ten micrometers. In some embodiments, the TFEO layer has a thickness of not more than one micrometer. In some embodiments, the thickness of the TFEO layer may be not more than seven hundred nanometers. In some such embodiments, the thickness may be not more than four hundred nanometers. Other thicknesses are possible. Thus, devices utilizing various materials are desired to be integrated with TFEO devices such as TFLN and TFLT devices.

Integration of other photonics devices with lithium-containing TFEO devices may be performed at the device (i.e. chip or integrated circuit) level. For example, SiPh devices (e.g. III-V SiPh devices) may be desired to be integrated with TFLN devices on the same die. Devices in which different materials are integrated on the same die are generally termed heterogeneous devices herein. Another technique for integrating heterogeneous materials may be to utilize side-by-side packaging of different dies. Devices in which different dies having different materials are packaged together are generally termed hybrid devices herein. For example, an InP integrated circuit (i.e. InP lasers on an InP substrate) may be aligned with and packaged adjacent to a TFLN integrated circuit. In other cases, the III-V SiPh integrated circuit may be packaged side-by-side with a TFLN integrated circuit.

Although integration of TFEO such as TFLN and/or TFLT with SiPh and/or III-V devices is possible, sacrifices in the desired performance are made to achieve integration. For example, an insulator (e.g. a buried oxide (BOX) layer) may have different desired thicknesses for SiPh devices than for TFLN devices. In general, the BOX layer for a TFLN and/or TFLT device is generally significantly thicker (e.g. five to fifteen micrometers in thickness or more) than the BOX layer for a SiPh device (e.g. one to three micrometers). As a result, a heterogeneous device may have poorer performance than desired. Different materials also have different properties. For example, the coefficients of thermal expansion for material(s) for SiPh and/or III-V device(s) may be different than those of material(s) used in a TFLN and/or TFLT device formed on a LN and/or LT substrate. This may result in alignment issues in side-by-side packaging and/or other issues with performance or reliability. Other techniques for integrating devices may have issues with packaging complexity, alignment issues, or performance. Thus, potential benefits that may be desired from integration may be surrendered in order to achieve integration. Consequently, integration of heterogeneous devices may be adversely affected.

A hybrid photonics device package is described. The hybrid photonics device package includes an electro-optic integrated circuit and a photonics integrated circuit. The electro-optic integrated circuit includes an optical structure and an electrode on a first substrate. The optical structure has a thin film electro-optic layer including lithium. The photonics integrated circuit includes a second substrate and a photonics component on the second substrate. The photonics component and the optical structure are optically coupled. One of the electro-optic integrated circuit and the photonics integrated circuit is mounted on an other of the electro-optic integrated circuit and the photonics integrated circuit. In some embodiments, the one of the photonics integrated circuit and the electro-optic integrated circuit is flip-chip mounted on the other of the photonics integrated circuit and the electro-optic integrated circuit.

For example, the first substrate of the electro-optic integrated circuit may have a depression therein. The depression is configured to receive at least a portion of the photonics integrated circuit. In some embodiments, photonics integrated circuit is flip-chip mounted such that the portion of the photonics integrated circuit is aligned with the depression. The second substrate of the photonics integrated circuit may be mounted to the first substrate at the depression.

In some embodiments, the second substrate of the photonics integrated circuit has a depression therein. The depression is configured to receive at least a portion of the electro-optic integrated circuit. In some embodiments, the electro-optic integrated circuit is flip-chip mounted such that the portion of the electro-optic integrated circuit is aligned with the depression. The first substrate of the electro-optic integrated circuit may be mounted to the second substrate at the depression.

In some embodiments, the first substrate includes a first silicon substrate and a first oxide layer on the first silicon substrate. The second substrate includes a second silicon substrate and a second oxide layer on the second silicon substrate. The first oxide layer has a first oxide thickness of at least three micrometers, while the second oxide layer has a second oxide thickness of less than two micrometers. In some embodiments, the photonics component includes lasers and the optical structure includes waveguides optically coupled to the plurality of lasers. The photonics component may include optical detectors. The photonics integrated circuit may be optimized for the photonics component, while the electro-optic integrated circuit is optimized for the optical structure and the electrode.

A hybrid photonics device package including an electro-optic integrated circuit and a silicon photonics integrated circuit is described. The electro-optic integrated circuit includes a thin film electro-optic layer including lithium and an electrode on a first substrate. The thin film electro-optic layer has a ridge waveguide and a slab portion formed therein. The first substrate includes a first oxide layer having a thickness of at least five micrometers on a first underlying substrate. The silicon photonics integrated circuit includes a second substrate and at least one silicon photonics component on the second substrate. The photonics component(s) includes at least one of a III-V laser array and a photodetector array. The second substrate includes a second oxide layer having a thickness of less than five micrometers on a silicon substrate. The photonics component(s) and the optical structure are optically. One of the electro-optic integrated circuit and the photonics integrated circuit is mounted on an other of the electro-optic integrated circuit and the photonics integrated circuit.

For example, the first substrate of the electro-optic integrated circuit may have a depression therein. The depression is configured to receive at least a portion of the photonics integrated circuit. In some embodiments, photonics integrated circuit is flip-chip mounted such that the portion of the photonics integrated circuit is aligned with the depression. The second substrate of the photonics integrated circuit may be mounted to the first substrate at the depression.

In some embodiments, the second substrate of the photonics integrated circuit has a depression therein. The depression is configured to receive at least a portion of the electro-optic integrated circuit. In some embodiments, the electro-optic integrated circuit is flip-chip mounted such that the portion of the electro-optic integrated circuit is aligned with the depression. The first substrate of the electro-optic integrated circuit may be mounted to the second substrate at the depression.

A hybrid photonics device package including an electro-optic integrated circuit and a silicon photonics integrated circuit is described. The electro-optic integrated circuit includes a thin film electro-optic layer including lithium and an electrode on a first substrate. The thin film electro-optic layer has a ridge waveguide and a slab portion formed therein. The first substrate includes a first oxide layer having a thickness of at least five micrometers on a first underlying substrate. The silicon photonics integrated circuit includes a second substrate and at least one silicon photonics component on the second substrate. The photonics component(s) includes at least one of a III-V laser array and a photodetector array. The second substrate includes a second oxide layer having a thickness of less than five micrometers on a silicon substrate. The photonics component(s) and the optical structure are optically. One of the electro-optic integrated circuit and the photonics integrated circuit is mounted on an other of the electro-optic integrated circuit and the photonics integrated circuit.

A method for providing a hybrid photonics device package is described. The method includes packaging an electro-optic integrated circuit with a photonics integrated circuit. The electro-optic integrated circuit includes an optical structure and an electrode on a first substrate. The optical structure has a thin film electro-optic layer that includes lithium. The photonics integrated circuit includes a second substrate and a photonics component on the second substrate. The photonics component is optically coupled with the optical structure. The packaging further includes mounting one of the electro-optic integrated circuit and the photonics integrated circuit on an other of the electro-optic integrated circuit and the photonics integrated circuit. In some embodiments, the mounting includes flip-chip mounting the photonics integrated circuit on the electro-optic integrated circuit or flip-chip mounting the electro-optic integrated circuit on the photonics integrated circuit.

The first substrate of the electro-optic integrated circuit may have a depression therein. The depression is configured to receive at least a portion of the photonics integrated circuit. In such embodiments, the mounting may also include flip-chip mounting the photonics integrated circuit such that the portion of the photonics integrated circuit is aligned with the depression or mounting the second substrate of the photonics integrated circuit to the first substrate at the depression.

In some embodiments, the second substrate of the photonics integrated circuit has a depression that is configured to receive at least a portion of the electro-optic integrated circuit. In such embodiments, the mounting includes flip-chip mounting the electro-optic integrated circuit such that the portion of the electro-optic integrated circuit is aligned with the depression or mounting the first substrate of the electro-optic integrated circuit to the second substrate at the depression. The first substrate includes a first silicon substrate and a first oxide layer on the first silicon substrate. The second substrate includes a second silicon substrate and a second oxide layer on the second silicon substrate. The first oxide layer has a first oxide thickness of at least three micrometers. The second oxide layer has a second oxide thickness of less than two micrometers. In some embodiments, the photonics component includes a plurality of lasers and wherein the optical structure includes a plurality of waveguides optically coupled to the plurality of lasers. In some embodiments, the photonics integrated circuit is optimized for the photonics component, and wherein the electro-optic integrated circuit is optimized for the optical structure and the electrode.

Figure 1B:
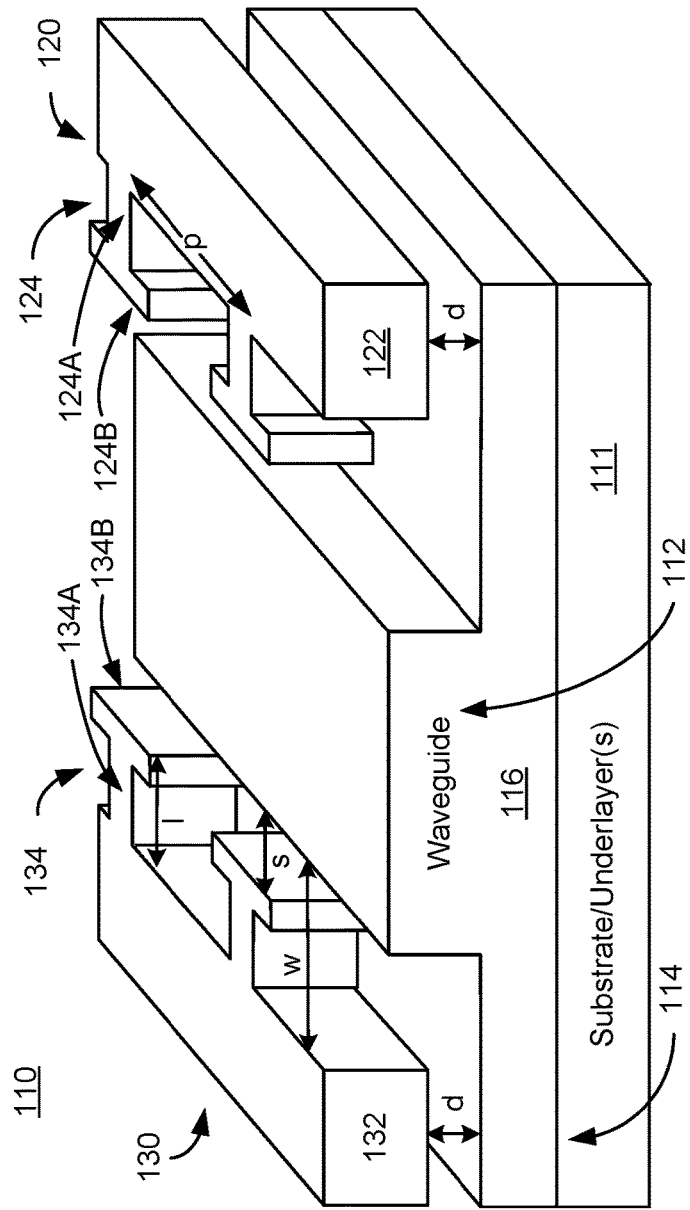

FIGS. 1A-1B depict an embodiment of hybrid device package 100. FIG. 1A depicts hybrid device package 100 including photonics integrated circuits (also termed devices) 110 and 150. FIG. 1B depicts a portion of photonics integrated circuit 110. For clarity, FIGS. 1A and 1B are not to scale and not all components are shown. System 100 includes thin film electro-optic (TFEO) integrated circuit 110 and photonics integrated circuit 150. TFEO integrated circuit 110 includes at least one component formed from a lithium-containing TFEO material, such as TFLN and/or TFLT. In contrast, phonics integrated circuit 150 includes photonic devices 152 and 154 made from other material(s), such as Si and/or other materials. For example, devices 152 and 154 may include III-V lasers and/or photodetectors. Although depicted side-by-side, in some embodiments, TFEO integrated circuit 110 is mounted on photonics integrated circuit 150, or vice versa.

FIG. 1B depicts an embodiment of a portion of electro-optic device 110 including lithium containing TFEO materials. For clarity, electro-optic device 110 is not to scale and not all components are shown. For example, a top cladding layer is not shown. Such a cladding layer would cover the portions of the device depicted. Further, electro-optic device 110 may be configured differently in other embodiments. Electro-optic device 110 includes a substrate and/or underlayers 101, lithium-containing electro-optic layer 116 that has been formed into ridge waveguide 112 and slab portion 114, and electrodes 120 and 130. Electrode 120 includes channel region 122 and extensions 124. Electrode 130 includes channel region 132 and extensions 134. Electro-optic device 110 also includes barrier layers 150 and 160 forming a lithium barrier structure. Substrate 101 may include an underlying substrate such as Si and a BOX layer (not separately shown).

Electro-optic layer 116 is or includes a TFEO layer that may include or consist of LN and/or LT. In some embodiments, the nonlinear optical material for TFEO layer 116 is formed as a thin film. For example, the thin film may have a thickness (e.g. of thin film or slab portion 114 and ridge waveguide portion 112) of not more than three multiplied by the optical wavelengths for the optical signal carried in waveguide 112 before processing. In some embodiments, the thin film has a thickness (e.g. of thin film portion 114 and ridge waveguide portion 112) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. In some embodiment, the thin film has a total thickness of not more than one micrometer. In some embodiments, the thin film has a total thickness of not more than seven hundred nanometers. In some such embodiments, the thin film has a total thickness of not more than four hundred nanometers. In some embodiments, the thin film has a thickness of at least one hundred nanometers.

The thin film nonlinear optical material may be fabricated into waveguide 112 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (ME), inductively coupled plasma RIE. In some embodiments, a chemical etch and/or electron beam etch may be used. Waveguide 112 may thus have improved surface roughness. For example, the sidewall(s) of ridge 112 may have reduced surface roughness. For example, the short range root mean square surface roughness of a sidewall of the ridge 112 is less than ten nanometers. In some embodiments, this root mean square surface roughness is not more than five nanometers. In some cases, the short range root mean square surface roughness does not exceed two nanometers. Thus, waveguide 112 may have the optical losses in the range described above. In some embodiments, the height of ridge waveguide 112 is selected to provide a confinement of the optical mode such that there is a 10 dB reduction in intensity from the intensity at the center of ridge waveguide 112 at ten micrometers from the center of ridge waveguide 112. For example, the height of ridge waveguide 112 is on the order of a few hundred nanometers in some cases. However, other heights are possible in other embodiments. A portion of waveguide 112 is proximate to electrodes 120 and 130 along the direction of transmission of the optical signal (e.g. from the input of the optical signal through waveguide 112 to the modulated optical signal output). The portion of waveguide 112 proximate to electrodes 120 and 130 may the lengths described above, for example a length greater than two millimeters in some embodiments, and greater than two or more centimeters in some such embodiments. Such lengths are possible at least in part because of the low optical losses per unit length for waveguide 112 described above. Further, the portion of waveguide 112 proximate to electrodes 120 and 130 has an optical mode cross-sectional area that is small, as described above for waveguide 112.

Electrodes 120 and 130 apply electric fields to waveguide 112. Electrode(s) 120 and/or 130 may be fabricated using deposition techniques, such as electroplating, and photolithography to shape the electrode 120 and/or 130. The resulting electrode 120 and/or 130 may have a lower frequency dependent electrode loss, in the ranges described above with respect to electrodes 120 and 130. Electrode 120 includes a channel region 122 and extensions 124 (of which only one is labeled in FIG. 1B). Electrode 130 includes a channel region 132 and extensions 134 (of which only one is labeled in FIG. 1B). In some embodiments, extensions 124 or 134 may be omitted from electrode 120 or electrode 130, respectively. Extensions 124 and 134 are closer to waveguide 112 than channel region 122 and 132, respectively, are. For example, the distance s from extensions 124 and 134 to waveguide ridge 112 is less than the distance w from channels 122 and 132 to waveguide ridge 112. In the embodiment shown in FIG. 1B, extensions 124 and 134 are at substantially the same level as channel regions 122 and 132, respectively. In some embodiments, the extensions may protrude above and/or below the channel regions in addition to or in lieu of being at the same level.

Extensions 124 and 134 are in proximity to waveguide 112. For example, extensions 124 and 134 are a vertical distance, d from TFEO layer 116. The vertical distance to TFEO layer 116 may depend upon the cladding (not shown in FIG. 1B) used. The distance d is highly customizable in some cases. For example, d may range from zero (or less if electrodes 120 and 130 contact or are embedded in thin film portion 114) to greater than the height of ridge 112. However, d is generally still desired to be sufficiently small that electrodes 120 and 130 can apply the desired electric field to waveguide 112. Extensions 124 and 134 are also a distance, s, from ridge 112. Extensions 124 and 134 are desired to be sufficiently close to TFEO layer 116 (e.g. close to ridge 112) that the desired electric field and index of refraction change can be achieved. However, extensions 124 and 134 are desired to be sufficiently far from TFEO layer 116 (e.g. from ridge 112) that their presence does not result in undue optical losses. Although the distance s is generally agnostic to specific geometry or thickness of TFEO layer 116, s may be selected to allow for both transverse electric and transverse optical modes that are confined differently in TFEO layer 116. However, the optical field intensity at extensions 124 and 134 (and more particularly at sections 124B and 134B) is desired to be reduced to limit optical losses due to absorption of the optical field by the conductors in extensions 124 and 134. Thus, s is sufficiently large that the total optical loss for waveguide 112, including losses due to absorption at extensions 124 and 134, is not more than the ranges described above (e.g. 10 dB or less in some embodiments, 1 dB or less in some embodiments, 4 dB or less in some embodiments). In some embodiments, s is selected so that optical field intensity at extensions 124 and 134 is less than −10 dB of the maximum optical field intensity in waveguide 112. In some embodiments, s is chosen such that the optical field intensity at extensions 124 and 134 is less than −40 dB of its maximum value in the waveguide. For example, extensions 124 and/or 134 may be at least two micrometers and not more than 2.5 micrometers from ridge 112 in some embodiments. In some embodiments, extensions 124 and/or 134 may extend over waveguide 112 if d is greater than the height of the ridge for waveguide 112.

In the embodiment shown, extensions 124 have a connecting portion 124A and a retrograde portion 124B. Retrograde portion 124B is so named because a part of retrograde portion may be antiparallel to the direction of signal transmission through electrode 120. Similarly, extensions 134 have a connecting portion 1234A and a retrograde portion 134B. Thus, extensions 124 and 134 have a "T"-shape. In some embodiments, other shapes are possible. For example, extensions 124 and/or 134 may have an "L"-shape, may omit the retrograde portion, may be rectangular, trapezoidal, parallelogram-shaped, may partially or fully wrap around a portion of waveguide 112, and/or have another shape. Similarly, channel regions 122 and/or 132, which are shown as having a rectangular cross-section, may have another shape. Further, extensions 124 and/or 134 may be different sizes, as indicated by FIG. 1B. Although all extensions 124 and 134 are shown as the same distance from ridge 112, some of extensions 124 and/or some of extensions 134 may be different distances from ridge 112. Channel regions 122 and/or 132 may also have a varying size. In some embodiments, extensions 124 and 134, respectively, are desired to have a length, l (e.g. l=w−s), that corresponds to a frequency less than the Bragg frequency of the signal for electrodes 120 and 130, respectively. Thus, the length of extensions 124 and 134 may be desired to be not more than the microwave wavelength of the electrode signal divided by π at the highest frequency of operation for electrodes 120 and 130. In some embodiments, the length of extensions 124 and 134 is desired to be less than the microwave wavelength divided by twelve. For example, if the maximum operation frequency is 300 GHz, which corresponds to a microwave wavelength of 440 micrometers in the substrate, extensions 124 and 134 are desired to be at smaller than approximately 37 micrometers. Individual extensions 124 and/or 134 may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 124 and 134. Thus, the pitch for extensions 124 and 134 may be desired to be not more than the microwave wavelength of the electrode signal divided by π at the highest frequency of operation for electrodes 120 and 130. In some embodiments, the pitch is desired to be less than the microwave wavelength divided by twelve. In some embodiments, the pitch is desired to be less than the microwave wavelength divided by seventy two, allowing for a low ripple in group velocity.

Extensions 124 and 134 are closer to ridge 112 than channels 122 and 132, respectively, are (e.g. s<w). In some embodiments, a dielectric cladding (not explicitly shown in FIG. 1B) resides between electrodes 120 and 130 and TFEO layer 116. As discussed above, extensions 124 and 134 are desired to have a length (w−s) that corresponds to a frequency less than the Bragg frequency of the signal for electrodes 120 and 130, respectively. Extensions 124 and 134 are also desired to be spaced apart from ridge 112 as indicated above (e.g. such that the absorption loss in waveguide 112 can be maintained at the desired level, such as 10 dB or less). The length of the extensions 124 and 134 and desired separation from ridge 112 (e.g. s) are considered in determining w. Although described in the context of a horizontal distance, the distance between electrode structures and the waveguide also applies for vertical configurations. Other distances between ridge waveguide 112 and channel regions 122 and/or 132 are possible.

Extensions 124 and 134 protrude from channel regions 122 and 132, respectively, and reside between channel regions 122 and 132, respectively, and waveguide 110. As a result, extensions 124 and 134 are sufficiently close to waveguide 110 to provide an enhanced electric field at waveguide 110. Consequently, the change in index of refraction induced by the electric field is increased. In contrast, channel regions 122 and 132 are spaced further from waveguide 110 than the extensions 124 and 134. Thus, channel region 122 is less affected by the electric field generated by electrode 130/extensions 134. Electrical charges have a reduced tendency to cluster at the edge of channel region 122 closest to electrode 130. Consequently, current is more readily driven through central portions channel region 122 and the electrode losses in channel region 122 (and electrode 120) may be reduced. Because microwave signal losses through electrodes 120 and 130 may be reduced, a smaller driving voltage may be utilized for electrode(s) 120 and/or 130 and less power may be consumed by optical device 100. In addition, the ability to match the impedance of electrode 120 with an input voltage device (not shown) may be improved. Such an impedance matching may further reduce electrode signal losses for optical device 100. Moreover, extensions 124 and 134 may affect the speed of the electrode signal through electrodes 120 and 130. Thus, extensions 124 and 134 may be configured to adjust the velocity of the electrode signal to match the velocity of the optical signal in waveguide 110. Consequently, performance of optical device 100 may be improved.

The use of extensions 124 and 134 may improve performance. Use of electrodes 120 and 130 having extensions 124 and 134, respectively, may reduce microwave losses, allow for a large electric field at ridge waveguide 112 and improve the propagation of the microwave signal through electrodes 120 and 130, respectively. Further, the low surface roughness of the sidewalls of waveguide 112 may reduce optical losses. Consequently, performance of electro-optic device 110 may be significantly enhanced.

Although integrated together in a hybrid photonics device package 100, electro-optic integrated circuit 110 and photonics integrated circuit 130 may be separately fabricated and/or optimized for their individual functions. For example, substrate 111 may include a buried oxide (BOX) layer (e.g. a silicon dioxide layer) having a thickness of at least three micrometers. In some embodiments, the thickness of the BOX layer for electro-optic integrated circuit 110 may be at least five micrometers (or at least ten micrometers) and not more than fifteen micrometers. In contrast, a BOX layer (not shown) for photonics integrated circuit 150 may be less than three micrometers thick. In some embodiments, the BOX layer for photonics integrated circuit 150 may be at least one micrometer and not more than two micrometers thick. Such thicknesses are selected to optimize the individual performance of integrated circuits 110 and 150. Further, substrate 111 may have a/different thickness than the substrate for photonics integrated circuit 150. Moreover, the lithium (e.g. LN and/or LT) used in TFEO layer 116 without adversely affecting fabrication of components in photonics integrated circuit 150. If fabricated together, lithium may diffuse into portions of photonics integrated circuit 150. Because integrated circuits 110 and 150 are separately fabricated and optimized, diffusion of lithium into photonics integrated circuit 150 may be reduced or eliminated.

Combining electro-optic device 110 with photonics device 150 may improve and extend performance as described herein. Further, devices 110 and 150 may be configured to facilitate integration, for example via flip chip bonding and/or other bonding techniques. For example, regions of devices 110 and/or 150 may be patterned in order to facilitate integration of devices 110 and 150.

Figures 2A, 2B:
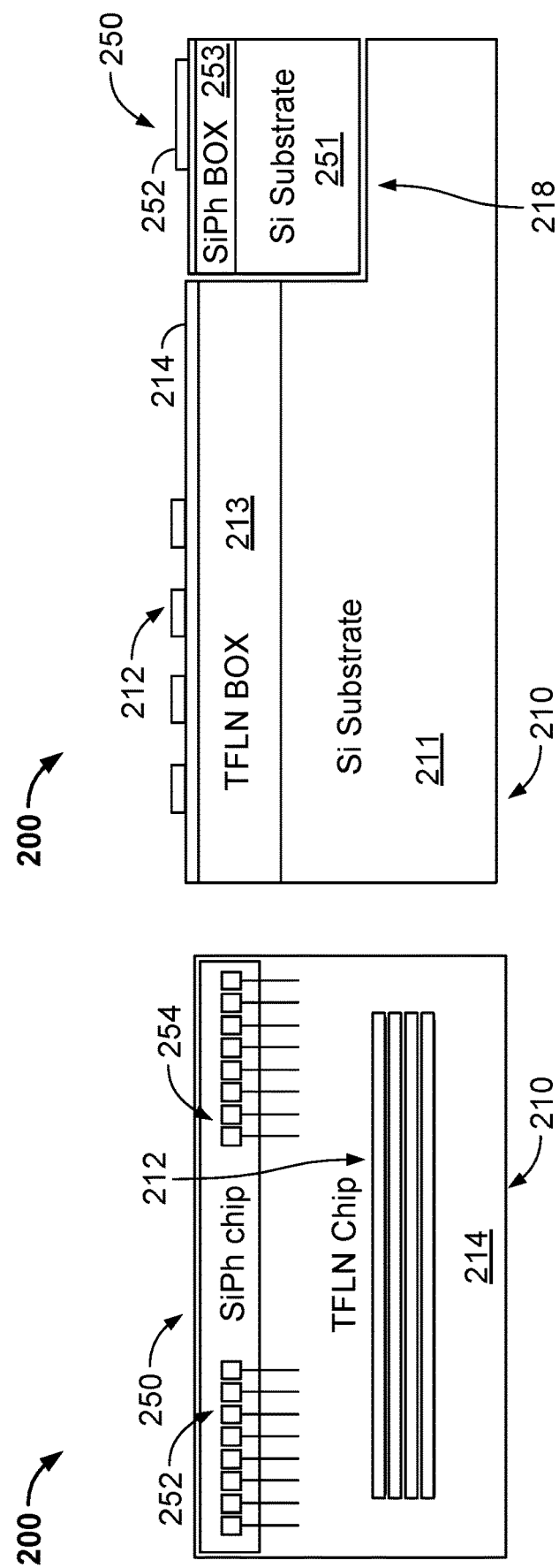
FIGS. 2A and 2B depict top and cross-sectional views of an embodiment of a hybrid photonics device package.

FIGS. 2A and 2B depict top and cross-sectional views of an embodiment of hybrid photonics device package 200. For clarity, only some components are shown. For example, electrodes and/or other waveguides or taps are not shown. FIGS. 2A-2B are not to scale.

Hybrid package 200 includes heterogeneous photonics materials. In particular, SiPh integrated circuit (i.e. SiPh chip) 250 and a lithium-containing TFEO integrated circuit 210 are packaged together. In the embodiment shown, lithium-containing TFEO integrated circuit 210 is a TFLN integrated circuit (i.e. a TFLN chip). Other TFEO layers including but not limited to TFLT may be used. TFLN chip includes waveguides 212 and slab portion 214 formed from a TFLN layer and a substrate (not separately labeled). The substrate includes insulator (TFLN BOX layer in the embodiment shown) 213 and underlying Si substrate 211. TFLN BOX layer 213 is generally thick (e.g. at least three micrometers in some embodiments, at least five micrometers in some embodiments, at least ten micrometers in some embodiments, and not more than thirty micrometers in some embodiments). Thicker BOX layer 213 may improve optical and/or microwave performance of TFLN integrated circuit 210. Other components that are not shown may be present. For example, TFLN integrated circuit 210 may include electrodes and optical couplers for waveguides 212. Waveguides 212 may include other features including but not limited to mode converters, bends, and the like.

SiPh integrated circuit 250 includes laser array 252 and detector array 254. Laser array 252 includes a number of lasers (e.g. one or more lasers which are not separately labeled for simplicity), while detector array 254 includes photodetectors (e.g. one or more photodetectors that are not labeled for simplicity). The photodetectors in detector array 254 typically receive a tapped output from the lasers in the laser array 252. In some embodiments, SiPh integrated circuit 250 may have only laser(s) 252, only photodetector(s) 254, or only other components (not shown). SiPh integrated circuit 250 may be a III-V heterogeneous integrated circuit. For example, laser array 252 may include one or more InP lasers.

SiPh integrated circuit 250 also includes a substrate (not separately labeled) having insulator (SiPh BOX layer 213 in the embodiment shown) and underlying Si substrate 251. SiPh BOX layer 253 is generally thinner than TFLN BOX layer 213. For example, SiPh BOX layer 253 may be at least eight hundred nanometers in some embodiments, at least one micrometer in some embodiments, not more than three micrometers in some embodiments, and not more than two micrometers in some embodiments. Other thicknesses are possible. Thinner SiPh BOX layer 253 may improve optical performance of the lasers in laser array 252. Other components that are not shown may be present. For example, SiPh integrated circuit 250 may include waveguides and/or electrodes.

TFLN integrated circuit 210 and SiPh integrated circuits 250 are packaged together. In so doing, the optical component (e.g. lasers 252) on SiPh integrated circuit 250 are aligned and optically coupled with waveguides 212 on TFLN integrated circuit 210. In order to integrate SiPh integrated circuit 250 with TFLN integrated circuit 210, depression 218 in the substrate for TFLN integrated circuit 210 is formed. In the embodiment shown, depression 218 includes an aperture in or removal of a portion of the BOX layer 213 and a trench in Si substrate 211. Depression 218 is also at the edge of the TFLN integrated circuit 210. In some embodiments, depression 218 may be located elsewhere. For example, depression 218 might not be at the edge of TFLN integrated circuit 210 and/or may not extend into the Si substrate 211. Depression 218 is configured to receive at least a portion of SiPh integrated circuit 210. For example, in some embodiments, the depth of depression 218 in the substrate is configured to improve alignment between the TFLN waveguides 212 and the SiPh optical components such as laser 252. Depression 218 is also configured such that the edge of SiPh integrated circuit 250 does not extend beyond the edge of TFLN integrated circuit 210. Other configurations are possible. SiPh integrated circuit 250 is placed in depression 218 and affixed to TFLN integrated circuit 210.

Integrated device package 200 may have improved performance. For example, TFLN integrated circuit 210 and the SiPh integrated circuit 250 may be individually optimized for improved performance of the components therein. Further, SiPh and TFLN integrated circuits 250 and 210 may be separately qualified prior to packaging. Thus, a higher yield during production and improved performance of the devices may be achieved. In some embodiments, hybrid integrated device package 200 may also be lower in cost.

Figure 3B:
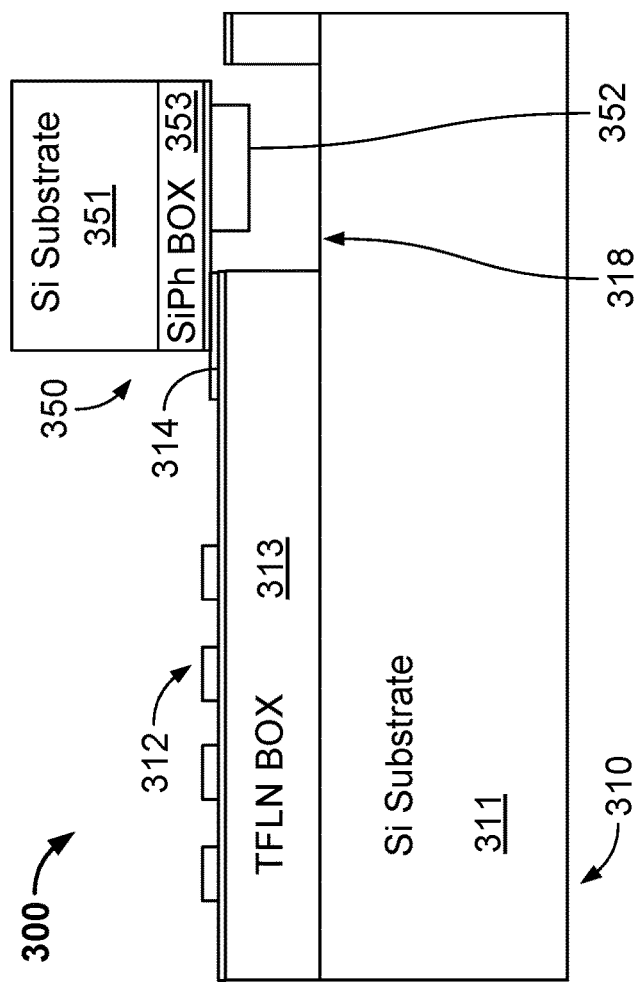
FIGS. 3A and 3B depict top and cross-sectional views of an embodiment of a hybrid photonics device package.
Figure 3A:
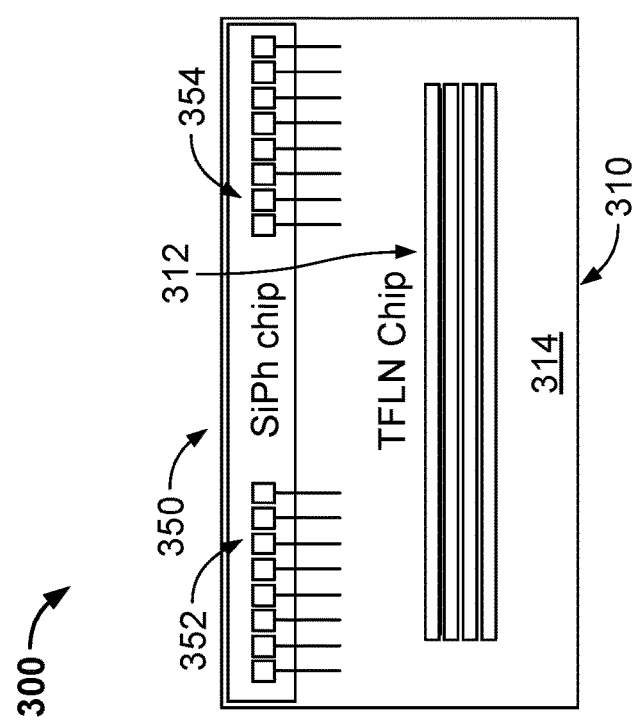

FIGS. 3A and 3B depict top and cross-sectional views of an embodiment of hybrid photonics device package 300. For clarity, only some components are shown and package 300 is not to scale. Hybrid package 300 shown in FIGS. 3A-3B is analogous to hybrid package 200 depicted in FIGS. 2A-2B. Thus, hybrid package 300 includes TFLN integrated circuit 310 and SiPh integrated circuit 350 that are analogous to TFLN integrated circuit 210 and SiPh integrated circuit 250. Further TFLN integrated circuit 310 includes waveguides 312 and slab portion 314 of a TFLN layer as well as Si substrate 311 and TFLN BOX layer 313 of a substrate that are analogous to waveguides 212, slab portion 214, Si substrate 211, and TFLN BOX layer 213 of TFLN integrated circuit 210. Similarly, SiPh integrated circuit 350 includes laser array 352 and photodetector array 354 that are analogous to laser array 252 and photodetector array 252 of SiPh integrated circuit 250. However, SiPh integrated circuit 350 has been flip-chip bonded to TFLN integrated circuit 210. Thus, depression 318 in the TFLN substrate may have a reduced depth. For example, in the embodiment shown, depression 318 is in TFLN BOX layer 313 but does not extend into Si substrate 311. In some embodiments, depression 318 may not extend through FLN box layer 313. In other embodiments, depression 318 may have another configuration. Although not expressly shown, depression 318 in the TFLN substrate may be completely covered by SiPh integrated circuit 350. In some embodiments, depression 318 is filled (e.g. by bonding material) such that no empty space exists between SiPh integrated circuit 350 and TFLN integrated circuit 310. Further, some or all of Si substrate 351 for SiPh integrated circuit 350 may be removed in some embodiments.

Integrated device package 300 may have improved performance. For example, TFLN integrated circuit 310 and SiPh integrated circuit 350 may be individually optimized for improved performance of the components therein. Further, SiPh and TFLN integrated circuits 350 and 310, respectively, may be separately qualified before packaging. Fabrication may be improved by the use of flip-chip bonding. For example, alignment of SiPh integrated circuit 350 with TFLN integrated circuit 310 in the direction perpendicular to the surface of TFLN integrated circuit 310 may be facilitated. Thus, a higher yield during production and improved performance of the devices may be achieved. In some embodiments, the integrated device package may also be lower in cost.

Figure 4B:
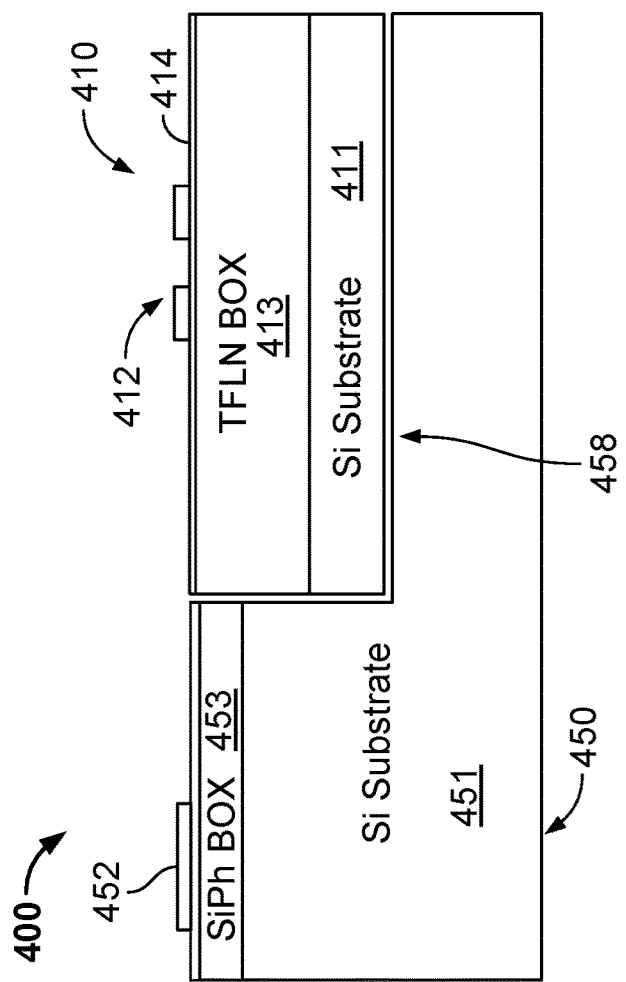
FIGS. 4A and 4B depict top and cross-sectional views of an embodiment of a hybrid photonics device package.
Figure 4A:
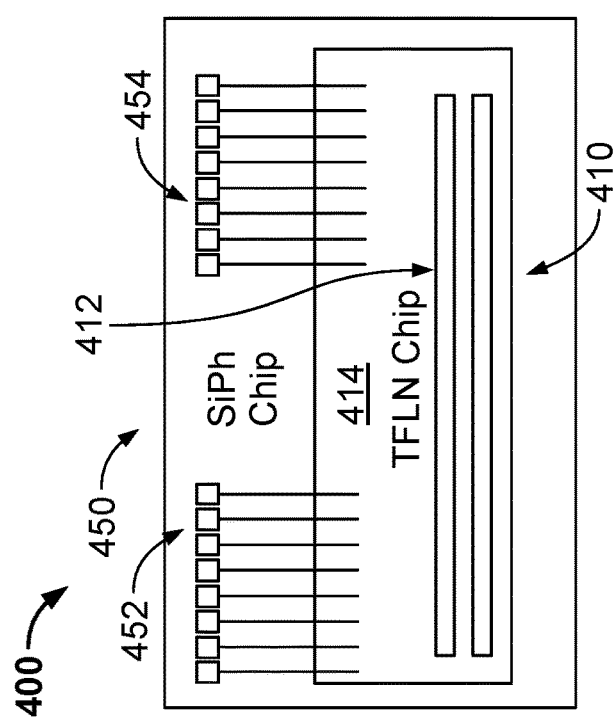

FIGS. 4A and 4B depict top and cross-sectional views of an embodiment of hybrid photonics device package 400. For clarity, only some components are shown. Hybrid package shown in FIGS. 4A-4B is analogous to hybrid package 200 depicted in FIGS. 2A-2B. Thus, hybrid package 400 includes TFLN integrated circuit 410 and SiPh integrated circuit 450 that are analogous to TFLN integrated circuit 210 and SiPh integrated circuit 250. Further, TFLN integrated circuit 410 includes waveguides 412 and slab portion 414 of a TFLN layer as well as Si substrate 411 and TFLN BOX layer 413 of a substrate that are analogous to waveguides 212, slab portion 214, Si substrate 211, and TFLN BOX layer 213 of TFLN integrated circuit 210. Similarly, SiPh integrated circuit 450 includes laser array 452 and photodetector array 454 that are analogous to laser array 252 and photodetector array 252 of SiPh integrated circuit 250. However, depression 458 has been formed in SiPh integrated circuit 450 instead of in TFLN integrated circuit 410. Thus, TFLN integrated circuit 410 has been bonded to SiPh integrated circuit 450.

Integrated device package 400 may have improved performance. For example, TFLN integrated circuit 410 and SiPh integrated circuit 450 may be individually optimized for improved performance of the components therein. Further, SiPh and TFLN integrated circuits 450 and 410, respectively, may be separately qualified prior to packaging. Thus, a higher yield during production and improved performance of the devices may be achieved. In some embodiments, integrated device package 400 may also be lower in cost.

FIGS. 5A and 5B depict top and cross-sectional views of an embodiment of hybrid photonics device package 500. For clarity, only some components are shown and hybrid photonics device package 500 is not to scale. Hybrid package 500 shown in FIGS. 5A-5B is analogous to hybrid package 400 depicted in FIGS. 4A-4B. Thus, hybrid package 500 includes TFLN integrated circuit 510 and SiPh integrated circuit 550 that are analogous to TFLN integrated circuit 410 and SiPh integrated circuit 450. Further, TFLN integrated circuit 510 includes waveguides 512 and slab portion 514 of a TFLN layer as well as Si substrate 511 and TFLN BOX layer 513 of a substrate that are analogous to waveguides 412, slab portion 414, Si substrate 411, and TFLN BOX layer 413 of TFLN integrated circuit 410. Similarly, SiPh integrated circuit 550 includes laser array 552 and photodetector array 554 that are analogous to laser array 452 and photodetector array 452 of SiPh integrated circuit 450. However, TFLN integrated circuit 510 has been flip-chip bonded to SiPh integrated circuit 550. Thus, hybrid package 500 is also analogous to hybrid package 300. In some embodiments, depression 518 in the SiPh substrate may have a reduced depth as compared to depression 418 in FIGS. 4A-4B. For example, although shown in FIG. 5B as extending into the Si substrate of SiPh integrated circuit 550, depression 518 may only be in SiPh BOX layer 553, or may extend only to the top surface of Si substrate 511. In other embodiments, depression 518 may have another configuration. Although not expressly shown, depression 518 in the SiPh substrate may not be completely covered by TFLN integrated circuit 510. In some embodiments, depression 518 is filled (e.g. by bonding material) such that no empty space exists between SiPh integrated circuit 550 and the TFLN integrated circuit 510. Further, some or all of Si substrate 511 for TFLN integrated circuit 510 may be removed in some embodiments.

Hybrid integrated device package 500 may have improved performance. For example, TFLN integrated circuit 510 and SiPh integrated circuit 550 may be individually optimized for improved performance of the components therein. Further, SiPh and TFLN integrated circuits 550 and 510, respectively may be separately qualified before packaging. Flip-chip bonding may also improve fabrication. Thus, a higher yield during production and improved performance of the devices may be achieved. In some embodiments, hybrid integrated device package 500 may also be lower in cost.

Various devices 100 200, 300, 400, and 500 have been described. The present invention is not limited to the embodiments described. For example, various aspects of the devices described may be combined in manners not explicitly described.

Figure 6:
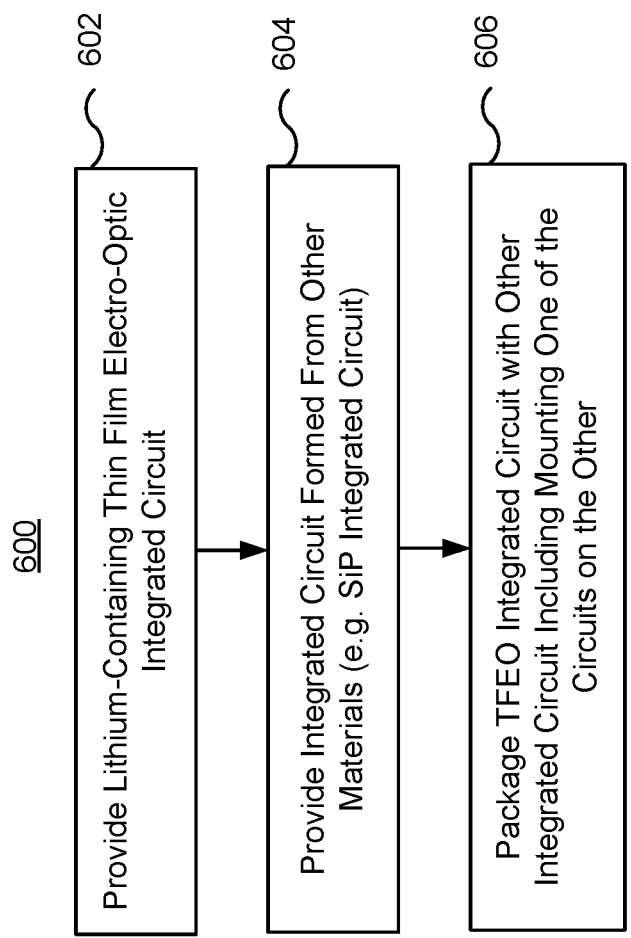
FIG. 6 is a flow chart depicting an embodiment of a method for providing a hybrid photonics device package.

FIG. 6 is a flow chart depicting an embodiment of method 600 for providing a hybrid photonics device package. Method 600 is described in the context of processes that may have sub-processes. Although described in a particular order, another order not inconsistent with the description herein may be utilized.

A lithium-containing TFEO integrated circuit is provided, at 602. In some embodiments, 602 includes fabricating all or part of the TFEO integrated circuit. In some embodiments, 602 includes obtaining the TFEO integrated circuit. For example, the TFEO integrated circuit may be purchased.

Another integrated circuit is provided, at 604. In some embodiments, 604 includes fabricating all or part of the other integrated circuit. In some embodiments, 604 includes obtaining the other integrated circuit. For example, the other integrated circuit may be purchased. The integrated circuit provided at 604 may be a photonics integrated circuit, such as a SiPh integrated circuit.

The TFEO integrated circuit is packaged with the other photonics integrated circuit, at 606. Packaging at 606 includes mounting the TFEO integrated circuit on the other integrated circuit or vice versa. 606 also includes preparing the integrated circuits for packaging. For example, depressions or other features may be formed. In some embodiments, preparation may be part of providing the integrated circuits at 602 and/or 604. Thus, the integrated circuits are aligned, put in place, and bonded at 606. Also at 606, one or more of the optical structures (e.g. waveguides) in the TFEO integrated circuit and are coupled with one or more optical components (e.g. lasers or photodetectors) in other integrated circuit. In some embodiments, flip-chip bonding is performed as part of 606.

For example, TFEO integrated circuit 210 or 310 may be provided, at 602. In some embodiments, depression 218 or 318 is formed in TFEO integrated circuit 210 or 310 as part of 602. SiPh integrated circuit 250 or 350 is provided (e.g. fabricated and/or obtained) at 604. SiPh integrated circuit 250 or 350 is aligned with depression 218 or 318 and bonded to TFEO integrated circuit 210 or 310 at 606. In some embodiments, depression 218 or 318 is formed as part of 606. Thus, hybrid packages 200 and 300 may be formed. In another example, TFEO integrated circuit 410 or 510 may be provided, at 602. SiPh integrated circuit 450 or 550 is provided (e.g. fabricated and/or obtained) at 604. In some embodiments, depression 458 or 558 is formed in SiPh integrated circuit 450 or 550 as part of 604. TFEO integrated circuit 410 or 510 is aligned with depression 458 or 558 and bonded to SiPh integrated circuit 450 or 550 at 606. In some embodiments, depression 458 or 558 is formed as part of 606. Hybrid packages 400 and/or 500 may thus be formed using method 600.

Using method 600, hybrid integrated device packages having improved performance may be formed. For example, TFLN integrated circuits and SiPh integrated 550 may be individually optimized and separately qualified before packaging. Flip-chip bonding may also improve fabrication. Thus, a higher yield during production and improved performance of the devices may be achieved. In some embodiments, these benefits may be attained at lower cost.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hybrid photonics device package, comprising:
an electro-optic integrated circuit including an optical structure and an electrode on a first substrate, the optical structure having a thin film electro-optic layer including lithium; and
a photonics integrated circuit including a second substrate and a photonics component on the second substrate, the second substrate of the photonics integrated circuit having a depression therein, the depression being configured to receive at least a portion of the electro-optic integrated circuit;
wherein the photonics component and the optical structure are optically coupled and wherein one of the electro-optic integrated circuit and the photonics integrated circuit is mounted on an other of the electro-optic integrated circuit and the photonics integrated circuit;
wherein the photonics component includes a plurality of lasers and wherein the optical structure includes a plurality of waveguides optically coupled to the plurality of lasers;
wherein the electro-optic integrated circuit is flip-chip mounted to the photonics integrated circuit such that at least a portion of the electro-optic integrated circuit is aligned with the depression and such that the first substrate is farther from the second substrate of the photonics integrated circuit than the optical structure is, at least a portion of the depression remaining empty such that a region of the depression adjacent to the electro-optic integrated circuit is free of a filler.

2. The hybrid photonics device package of claim 1, wherein the first substrate of the electro-optic integrated circuit is mounted to the second substrate at the depression.

3. The hybrid photonics device package of claim 1, wherein the first substrate includes a first silicon substrate and a first oxide layer on the first silicon substrate, and the second substrate includes a second silicon substrate and a second oxide layer on the second silicon substrate, the first oxide layer having a first oxide thickness of at least three micrometers, the second oxide layer having a second oxide thickness of less than two micrometers.

4. The hybrid photonics device package of claim 1, wherein the photonics component further includes a plurality of optical detectors.

5. The hybrid photonics device package of claim 1, wherein the photonics integrated circuit is optimized for the photonics component and wherein the electro-optic integrated circuit is optimized for the optical structure and the electrode.

6. The hybrid photonics device package of claim 1, wherein the electrode is configured to carry a microwave signal for modulating an optical signal carried by at least one waveguide of the plurality of waveguides.

7. A hybrid photonics device package, comprising:
an electro-optic integrated circuit including a thin film electro-optic layer including lithium and a plurality of electrodes on a first substrate, the thin film electro-optic layer having a plurality of ridge waveguides and at least one slab portion formed therein, the first substrate including a first oxide layer having a thickness of at least five micrometers on a first underlying substrate; and
a silicon photonics integrated circuit including a second substrate and at least one silicon photonics component on the second substrate, the at least one silicon photonics component including a III-V laser array including a plurality of lasers and a photodetector array including a plurality of photodetectors, the second substrate including a second oxide layer having a thickness of less than five micrometers on a silicon substrate;
wherein the at least one silicon photonics component and the plurality of ridge waveguides are optically coupled and wherein the electro-optic integrated circuit is mounted on the silicon photonics integrated circuit, the silicon photonics integrated circuit having a depression therein, the electro-optic integrated circuit being flip-chip mounted such that at least a portion of the electro-optic integrated circuit is aligned with the depression and such that the first substrate is farther from the second substrate of the silicon photonics integrated circuit than the plurality of ridge waveguides is, at least a portion of the depression remaining empty such that a region of the depression adjacent to the electro-optic integrated circuit is free of a filler.

8. A method for providing a hybrid photonics device package, comprising:
packaging an electro-optic integrated circuit with a photonics integrated circuit, the electro-optic integrated circuit including an optical structure and an electrode on a first substrate, the optical structure having a thin film electro-optic layer including lithium, the photonics integrated circuit including a second substrate and a photonics component on the second substrate, the photonics component being optically coupled with the optical structure; and wherein the packaging further includes
mounting the electro-optic integrated circuit on the photonics integrated circuit, the photonics integrated circuit having a depression therein, the mounting further including
flip-chip mounting the electro-optic integrated circuit such that at least a portion of the electro-optic integrated circuit is aligned with the depression and such that the first substrate is farther from the second substrate of the photonics integrated circuit than the optical structure is, at least a portion of the depression remaining empty such that a region of the depression adjacent to the electro-optic integrated circuit is free of a filler; and
wherein the photonics component includes a plurality of lasers and wherein the optical structure includes a plurality of waveguides optically coupled to the plurality of lasers.

9. The method of claim 8, wherein the first substrate includes a first silicon substrate and a first oxide layer on the first silicon substrate, and the second substrate includes a second silicon substrate and a second oxide layer on the second silicon substrate, the first oxide layer having a first oxide thickness of at least three micrometers, the second oxide layer having a second oxide thickness of less than two micrometers.

10. The method of claim 8, wherein the photonics integrated circuit is optimized for the photonics component and wherein the electro-optic integrated circuit is optimized for the optical structure and the electrode.

* * * * *